United States Patent [19]
Ohnishi et al.

[11] Patent Number: 5,754,342
[45] Date of Patent: May 19, 1998

[54] VIDEO DEVICE UTILIZING A TWO-DIMENSIONAL DIFFRACTION GRATING

[75] Inventors: Ikuo Ohnishi; Katsuya Fujisawa, both of Kurashiki, Japan

[73] Assignee: Kuraray Co., Ltd., Kurashiki, Japan

[21] Appl. No.: 863,906

[22] Filed: May 27, 1997

Related U.S. Application Data

[63] Continuation of Ser. No. 562,304, Nov. 22, 1995, abandoned, which is a continuation of Ser. No. 220,036, Mar. 30, 1994, abandoned.

[30] Foreign Application Priority Data

Mar. 31, 1993 [JP] Japan ................................. 5-074456
Jun. 18, 1996 [JP] Japan ................................. 5-147757

[51] Int. Cl.$^6$ ................................. G02B 5/18; H04N 5/72
[52] U.S. Cl. ................................. 359/569; 357/575; 348/382
[58] Field of Search ................................. 359/566, 568, 359/569, 574, 575; 250/226, 237 R, 237 G; 348/382, 383

[56] References Cited

U.S. PATENT DOCUMENTS

| | | | |
|---|---|---|---|
| 3,470,310 | 9/1969 | Shashoua | 359/568 |
| 3,641,255 | 2/1972 | Macovski | 359/568 |
| 3,728,014 | 4/1973 | Rosenblum | 359/569 |
| 3,914,761 | 10/1975 | Murase et al. | |
| 4,178,611 | 12/1979 | Okano | 359/569 |
| 4,360,251 | 11/1982 | Rajchman | |
| 4,426,130 | 1/1984 | Knop | 359/569 |
| 4,448,485 | 5/1984 | Bergman et al. | 359/569 |
| 5,007,709 | 4/1991 | Iida et al. | 359/569 |
| 5,113,286 | 5/1992 | Morrison | 359/569 |
| 5,155,622 | 10/1992 | Kawatsuki et al. | 359/569 |
| 5,280,388 | 1/1994 | Okayama et al. | 359/569 |
| 5,283,691 | 2/1994 | Ogasawara | 359/569 |

FOREIGN PATENT DOCUMENTS

| | | |
|---|---|---|
| 0 409 188 | 1/1991 | European Pat. Off. |
| 0 454 409 | 10/1991 | European Pat. Off. |
| 0 567 955 | 11/1993 | European Pat. Off. |
| 26 07 725 | 9/1976 | Germany |

OTHER PUBLICATIONS

Spie, vol. 679, 1986, pp. 165–168, M.T. Gale, et al., "Diffractive Diffusers for Display Applications".

*Primary Examiner*—Jon W. Henry
*Attorney, Agent, or Firm*—Oblon, Spivak, McClelland, Maier & Neustadt, P.C.

[57] ABSTRACT

A two-dimensional diffraction grating (5, 14) has a plurality of grating elements arranged in two directions (X, Y) different from each other. The grating elements in one of the directions (X, Y) have a substantially uniform grating height (h) when viewed in an arbitrarily chosen section along such one of the directions (X, Y) and, also, the grating elements in the other of the directions (X, Y) have a substantially uniform grating height (h) when viewed in an arbitrarily chosen section along the other of the directions (X, Y). An image display device includes an image display unit (4) including a plurality of pixels (10) patterned in a dot matrix in two dimensions and having a path (2) of travel of imagewise rays of light, and the two-dimensional diffraction grating (5) disposed on the path (2) of travel of the imagewise rays of light leading from the image display unit (4). An imaging device also includes the two-dimensional diffraction grating (14) disposed between a phototaking lens (12) and a solid-state imaging element (11).

10 Claims, 3 Drawing Sheets

VIDEO DEVICE UTILIZING A TWO-DIMENSIONAL DIFFRACTION GRATING

This is a Continuation of application Ser. No. 08/562,304, filed on Nov. 22, 1995, now abandoned; which is a continuation of application Ser. No. 08/220,036 filed Mar. 30, 1994; abandoned.

BACKGROUND OF THE INVENTION

1. Field of the Invention

The present invention relates to a video device such as, for example, a liquid crystal display device or an imaging device of a type utilizing a two-dimensional diffraction grating.

2. Description of the Prior Art

This type of liquid crystal display device is, for example, used as a viewfinder and generally comprises a liquid crystal cell adapted to be illuminated from rear by rays of light from a light source to provide a reproduction of an image which is viewed by a viewer looking through the viewfinder from a side remote from the light source. Since the rays of light from the light source which have passed through the liquid crystal cell and carried the image to be viewed is viewed, it often occurs that the quality of the image being viewed is lowered under the influence of shades of pixel electrodes and conductor lines contained in the liquid crystal cell.

Particularly where the liquid crystal cell is adapted to be driven by an active matrix drive system and, therefore, incorporates a number of non-linear elements such as thin-film transistors for the pixels to increase the capacity of information to be displayed so that televised pictures can be displayed, the nonlinear elements and pixel electrodes both used to drive the liquid crystal cell on the active matrix drive system are generally made of opaque material and, therefore, the active matrix liquid crystal cell is susceptible to a reproduction of relatively dark shades of the non-linear elements and the pixel electrodes.

These shades of the non-linear elements and pixel electrodes are, when projected by a lens on a screen or when a virtual image projected through a lens is viewed, considerably noticeable to such an extent as to result in a lowering of the quality of the image being viewed. In order to minimize the lowering of the quality of the image under the influence of shades of the non-linear element and electrodes, it has been suggested to employ a diffraction grating positioned in front of the liquid crystal cell, that is, at a location adjacent the eye of a viewer and remote from the light source.

While the use of the diffraction grating is effective to avoid the lowering of the quality of images being viewed under the influence of shades of the non-linear elements and pixel electrodes, it has been found that the use of the diffraction grating in turn brings about a reduction in contrast of the image to such an extent that the image being viewed is blurred.

On the other hand, in an imaging device of a type utilizing a solid-state imaging element, the solid-state imaging element makes use of a regularly, but non-continuously arranged pattern of pixels. Therefore, the imaging device of this kind is susceptible to generation of a spurious signal if the imagewise rays of light reflected from an object to be imaged contain a high spatial frequency component corresponding to the pitch between each neighboring pixels. Also, in a color imaging device of a single plate type employs a color filter array covering a surface of the solid-state imaging element to provide color signals and is therefore susceptible to generation of spurious color signals if the imagewise rays of light representative of an image of the object to be imaged contain a high spatial frequency component corresponding to a periodicity of each set of three-color filters forming the color filter array. In either case, in order to suppress generation of the spurious signals or the spurious color signals, an optical low-pass filter is employed in any of the monochromatic and color imaging devices.

The optical low-pass filter now in use is of a structure in which three or more quartz plates and a single infra-red cut-off filter are laminated together. This optical low-pass filter of the laminated structure has a problem in that it is difficult to mass-produce and is therefore expensive.

In view of the above, an optical low-pass filter comprising a diffraction grating has been developed such as disclosed in, for example, the Japanese (Examined) Patent Publication No. 49-20105, the Japanese Laid-open (Unexamined) Patent Publication No. 48-53741, and the Japanese (Examined) Patent Publication No. 57-42849.

It has, however, been found that, when the imaging device utilizing the optical low-pass filter comprising the diffraction grating is used to image an object to be viewed, the contrast of the image tends to be lowered accompanied by a blurring of the image.

SUMMARY OF THE INVENTION

Accordingly, the present invention has been developed to substantially eliminate the previously discussed problems and is aimed at providing an improvement in quality of images reproduced by a video device such as, for example, an image display device or an imaging device.

In order to accomplish this object of the present invention, an image display device according to the present invention makes use of a two-dimensional diffraction grating of a type which includes a plurality of grating elements arranged in two directions different from each other and in which the grating elements in one of the directions have a substantially uniform grating height when viewed in an arbitrarily chosen section along such one of the directions and, also, the grating elements in the other of the directions have a substantially uniform grating height when viewed in an arbitrarily chosen section along the other of the directions.

With this structure, since the two-dimensional diffraction grating disposed on an optical path of an image display unit has respective patterns of grating elements arranged in the two directions extending at an angle relative to each other, rays of light incident upon the two-dimensional diffraction grating are diffracted in two dimensions. As a result thereof, the diffracted light is diffused into shades of non-transparent portions of the pixels in the image display to an extent that they will not be noticeable, thereby bringing about an improvement in quality of the image being viewed. Also, the intensity of diffracted light of a relatively low order is increased to a value higher than that of diffracted light of a relatively high order and, therefore, the possibility that the image being viewed is blurred and the contrast thereof is lowered as a result of a leakage of the diffracted light of the high order into regions of adjacent pixels can be advantageously suppressed, accompanied by an increase in quality of the image.

According to a preferred embodiment of the present invention, the two-dimensional diffraction grating is of a type capable of exhibiting such a characteristic at a center wavelength of the image display device that the intensity of each of two diffracted lights of (±1, 0) orders and two diffracted lights of (0, ±1) orders is within the range of 60 to 180% of the intensity of diffracted light of zero order, the intensity of each of four diffracted lights of (±1, ±1) orders is within the range of 20 to 330% of the intensity of the diffracted light of zero order, and the sum of the intensities of the diffracted lights of zero order, (±1, 0) orders, (0, ±1) orders and (±1, ±1) orders is greater than 70% of the intensity of total diffracted light. It is to be noted that the center wavelength referred to above and hereinafter means a center value of a wavelength region of rays of light incident upon the image display unit (For example, in the case of the color imaging device, the center wavelength may be an average value of respective wavelengths of red- and blue-color rays of light) and the total diffracted light referred to above and hereinafter means all of the diffracted light of zero order, ±1 orders and higher orders.

According to this preferred embodiment, within an area of the diffracted light of the relatively low order which has a relatively high intensity, the ratio between the brightness at a center region of such area and that at a peripheral region of such area can take an appropriate value and, therefore, the quality of the image can further be improved.

An imaging device designed according to the present invention to accomplish the above described object of the present invention makes use of an optical low pass filter disposed between a photo-taking lens and a solid-state imaging element. This optical low-pass filter comprises a two-dimensional diffraction grating of a type which includes a plurality of grating elements arranged in two directions different from each other and in which the grating elements in one of the directions have a substantially uniform grating height when viewed in an arbitrarily chosen section along such one of the directions and, also, the grating elements in the other of the directions have a substantially uniform grating height when viewed in an arbitrarily chosen section along the other of the directions.

Even in this structure, the intensity of light of a relatively low order diffracted by the two-dimensional diffraction grating is increased to a value higher than that of light of a relatively high order also diffracted by the two-dimensional diffraction grating and, therefore, the possibility that the image being viewed is blurred and the contrast thereof is lowered as a result of a leakage of the diffracted light of the high order into regions of adjacent pixels can be advantageously suppressed, accompanied in an increase in quality of the image. Also, as is the case with the prior art, a high spatial frequency component of light contained in the image-wise rays of light representative of an image of the object to be photographed is effectively removed by the optical low-pass filter mode of the two-dimensional diffraction grating and, therefore, undesirable generation of spurious signals or spurious color signals can be advantageously suppressed.

According to another preferred embodiment of the present invention, the two-dimensional diffraction grating is of a type capable of exhibiting such a characteristic at a center wavelength of the image display device that the intensity of diffracted light of (±1, 0) order and that of diffracted light of (0, ±1) order are within the range of 90 to 210% of the intensity of diffracted light of zero order, the intensity of diffracted light of (±1, ±1) order is within the range of 20 to 420% of the intensity of the diffracted light of zero order, and the sum of the intensity of the diffracted light of zero order, that of the diffracted light of (±1, 0) order, that of the diffracted light of (0, ±1) order and that of the diffracted light of (±1, ±1) order is greater than 60% of the intensity of diffracted light. It is to be noted that the center wavelength referred to above and hereinafter means a center value of a wavelength region of rays of light with which the imaging device can work in taking an image of an object to be photographed (For example, in the case of the color imaging device, the center wavelength may be an average value of respective wavelengths of red- and blue-color rays of light.) and the diffracted light referred to above and hereinafter means all of the diffracted light of an order higher than zero and ±1 orders.

According to this different preferred embodiment, the intensity of the diffracted light of a relatively low order is higher than that of the diffracted light of a relatively higher order and, therefore, the possibility that the image being viewed is blurred and the contrast thereof is lowered as a result of a leakage of the diffracted light of the high order into regions of the pixels can be advantageously suppressed, accompanied in an increase in quality of the image.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
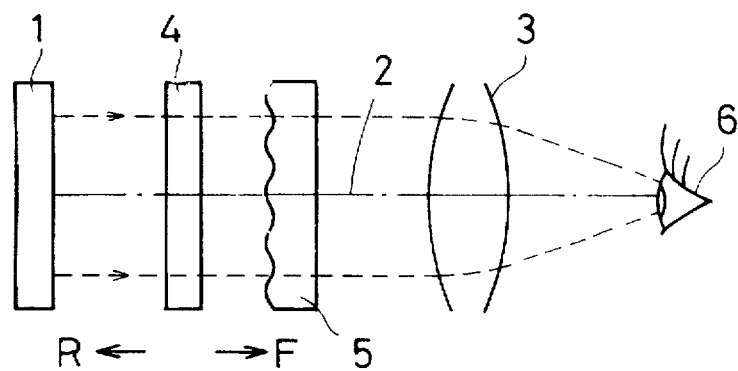
FIG. 1 is a schematic diagram showing an optical system employed in an image display device according to a first preferred embodiment of the present invention.

An image display device according to a first preferred embodiment of the present invention will first be described with reference to FIG. 1. The image display device shown in FIG. 1 is, although not exclusively limited thereto, a viewfinder generally employed in, for example, a video camera. The viewfinder includes a back light source 1 and an image display unit which is employed in the form of, for example, an active matrix liquid crystal cell 4 having a front surface and a rear surface opposite to the front surface thereof. The active matrix liquid crystal cell 4 is illuminated from the rear side R by rays of light emitted from the back light source 1. The viewfinder also includes a two-dimensional diffraction grating 5 which is positioned in front F of the active matrix liquid crystal cell 4, that is, on one side of the active matrix liquid crystal cell 4 remote from the back light source 1, and on a path 2 of travel of imagewise rays of light, and a group of lenses 3 positioned on one side of the two-dimensional diffraction grating 5 remote from the active matrix liquid crystal cell 4. A viewer represented by the eye 6 can look an image, formed on the active matrix liquid crystal cell 4 in any known manner, through the lens group 3 of the viewfinder.

The back light source 1 referred to above may comprise any suitable lamp such as, for example, halogen lamp, xenon lamp, metal halide lamp or fluorescent tube, with or without any suitable diffuser plate used in combination thereof, or a combination of any one of these lamps, a light guide plate and a diffuser plate. It is to be noted that, although the two-dimensional diffraction grating 5 has been described as positioned in front of the active matrix liquid crystal cell 4, it may be positioned in front of the lens group 3, that is, on one side of the lens group 3 remote from the active matrix liquid crystal cell 4.

Figure 2:
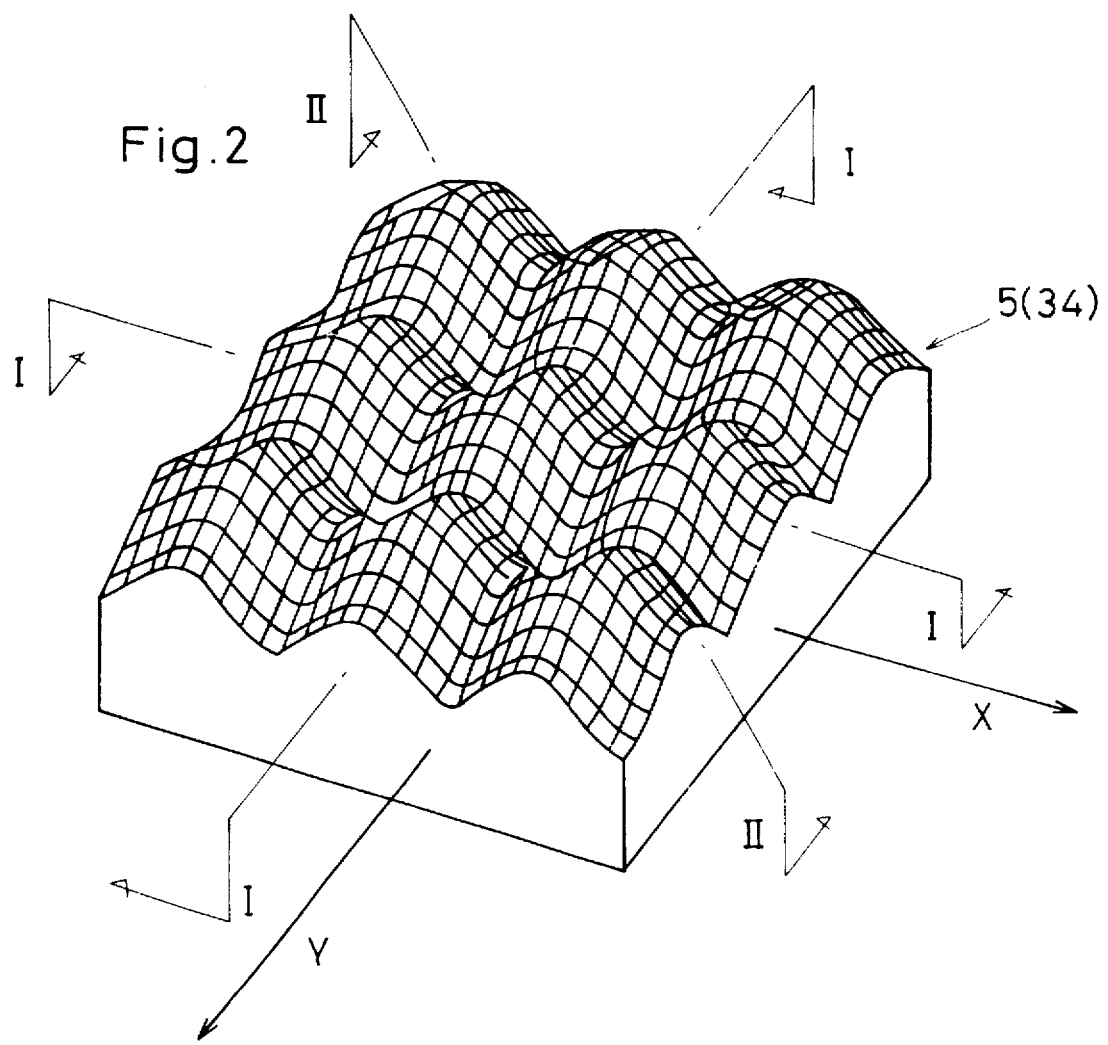
FIG. 2 is a fragmentary perspective view showing an example of a two-dimensional diffraction grating employed in the optical system of the image display device shown in FIG. 1.
Figure 3:
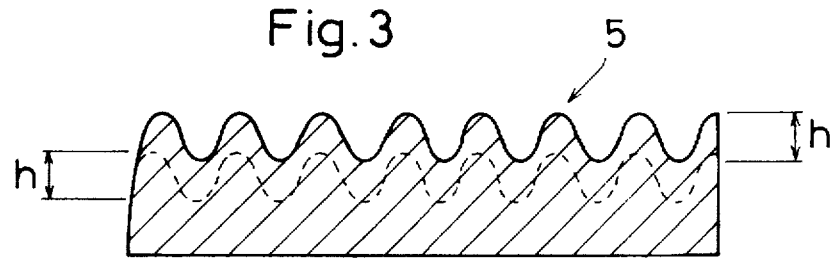
FIG. 3 is a fragmentary cross-sectional view taken along the line I—I in FIG. 2.

One example of the two-dimensional diffraction grating 5 conveniently employed in the practice of the present invention is shown in FIG. 2 in detail. As shown in FIG. 2, the two-dimensional diffraction grating 5 has respective periodic patterns of grating elements (projections) developing in X- and Y-directions perpendicular to each other. A cross-section of the two-dimensional diffraction grating 5 taken along the line I—I which conforms to one of the X- and Y-directions, that is, a sectional shape of hills of the grating elements, is shown in FIG. 3 in which a sectional shape of dales of the grating elements is also shown by the phantom line. As shown in FIG. 3, all of the grating elements of the two-dimensional diffraction grating 5 has a predetermined, uniform grating height (the difference between the level of each hill and that of the adjacent dale) except for any possible variation which would be introduced as a result of, for example, an error in manufacture of the two-dimensional diffraction grating. It is, however, to be noted that the grating height of the grating elements in the X-direction may not necessarily be equal to that of the grating elements in the Y-direction. It is also to be noted that, while the X- and Y-directions so far shown in FIG. 2 are at right angles to each other, the angle between the X- and Y-directions may be of any suitable angle other than 90 degrees.

Figure 4:
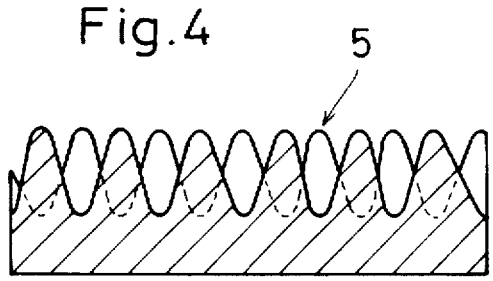
FIG. 4 is a fragmentary cross-sectional view taken along the line II—II in FIG. 2.

While the grating elements of a uniform grating height appear to exist in a third direction which does not conform to any one of the X- and Y-directions in which the grating elements are patterned, a cross-sectional representation of the two-dimensional diffraction grating 5 taken along the line II—II in FIG. 2, as shown in FIG. 4, makes it clear that no grating elements of a uniform grating height exist in such third direction other than any one of the X- and Y-directions of the two-dimensional diffraction grating 5 since, when viewed from a direction perpendicular to the third direction, the hills and the dales alternate with each other and no overlapping between the hills or between the dales is observed.

Figure 5:
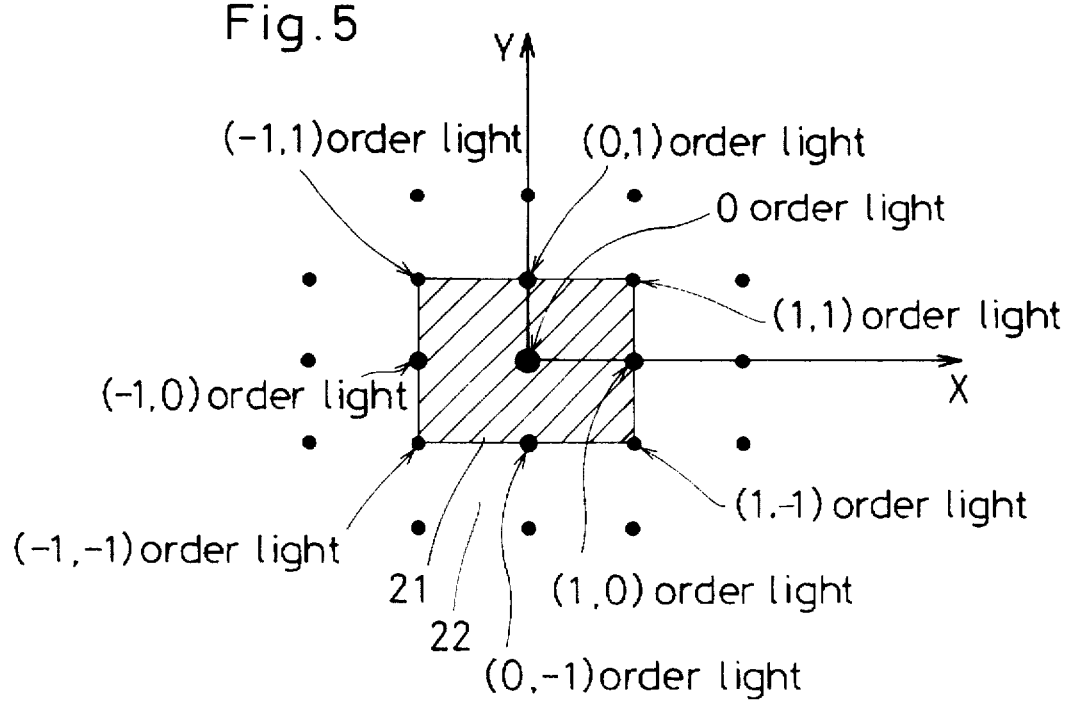
FIG. 5 is a diagram showing a pattern of diffraction of light exhibited by the two-dimensional diffraction grating.

When collimated light is projected onto the two-dimensional phase grating element 5 employed in the practice of the present invention, such a pattern of diffraction of light as shown in FIG. 5 can be obtained. Since as described above the two-dimensional diffraction grating 5 employed in the practice of the present invention has the patterns of the grating elements only in the X- and Y-directions, respectively, which are crossing each other, the intensity of diffracted light of a low order is higher than that of diffracted light of a high order. In other words, as shown in FIG. 5, with respect to the X- and Y-directions of the respective patterns of the grating elements, the intensities of diffracted lights of (1, 0) order, (0, −1) order, (−1, 0) order and (0, 1) order and that of diffracted light of (1, 1) order, (1, 1) order, (−1, −1) order and (−1, 1) order are considerably higher than the intensity of diffracted light of higher order, for example, those of diffracted lights of, for example, (2, 2) order and (2, −2) order. Namely, the intensity of diffracted light encompassed within a first area 21 shown as hatched in FIG. 5 is considerably higher than that of diffracted light in a second area 22 outside the first area 21.

Figure 6:
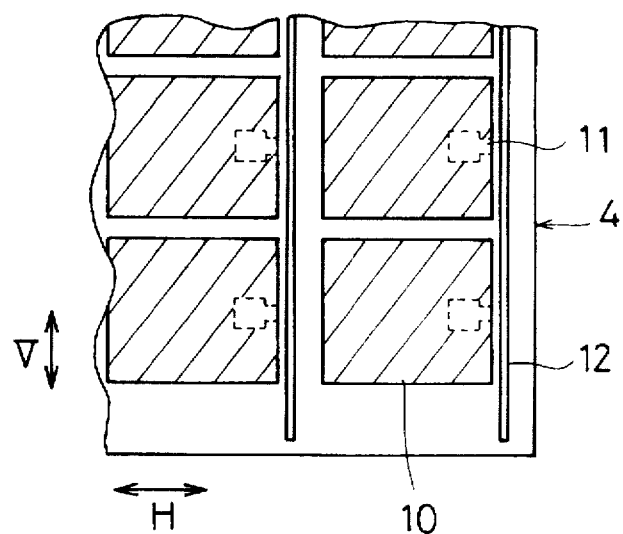
FIG. 6 is a fragmentary plan view of a liquid crystal cell employed in the image display device shown in FIG. 1.

An example of the active matrix liquid crystal cell 4 employed in the practice of the present invention is shown in FIG. 6 in a fragmentary plan view. The active matrix liquid crystal cell 4 is of a design operable to provide a visual representation of images in response to a video signal, for example, a television video signal or a video signal reproduced in a video tape recording and/or reproducing apparatus, and includes, as shown in FIG. 6, a plurality of transparent pixel electrodes 10 arranged in a dot matrix pattern in horizontal and vertical directions H and V, opaque non-linear elements 11 such as thin-film transistors, and opaque wirings 12, openings (shown by hatched areas in FIG. 6) corresponding to the transparent pixel electrodes 10 occupying only a portion. When, as shown in FIG. 1, the two-dimensional diffraction grating 5 is disposed between the active matrix liquid crystal cell 4 and the lens group 3 or between the lens group 3 and the viewer 6 (that is, on one side of the lens group 3 remote from the active matrix liquid crystal cell 4), imagewise rays of light having passed through the openings and subsequently impinging upon the two-dimensional diffraction grating 5 are distributed by diffraction in two dimensions as shown in FIG. 5 and, therefore, shades of the opaque non-linear elements 11 and those of the opaque wirings 12 will not be viewed. Also, since with the two-dimensional diffraction grating 5 employed in the present invention, the intensity of the diffracted light of the low order is considerably higher than that of the diffracted light of a high order, reduction in contrast and the degree of blurring of the reproduced image, both of which would occur as a result of a leakage of the diffracted light of the high order into the adjacent pixel areas 10, can advantageously be minimized.

Using a number of two-dimensional diffraction gratings which have been manufactured so as to have different grating heights and shapes, a series of experiments have been conducted to determine the extent to which a reduction in image quality resulting from appearance of shades of the non-linear elements and the electrodes is attained and, also, the extent to which the contrast of images is affected. Results of these experiments are shown in Table 1.

As Table 1 makes it clear, if the following conditions (1) to (3) are satisfied relative to the intensity of diffracted light of zero order at the center wavelength (550 nm) of the liquid crystal display device referred to above, not only can reduction in image quality resulting from the shades of the non-linear elements and the electrodes be further eliminated, but also the extent to which the image contrast is lowered is extremely low:

(1) the intensity of each of two diffracted lights of (±1, 0) orders and that of each of two diffracted lights of (0, ±1) orders are within the range of 60 to 180% of the intensity of the diffracted light of zero order, (2) the intensity of each of four diffracted lights of (±1, ±1) orders is within the range of 20 to 330% of the intensity of the diffracted light of zero order, and (3) the sum of the intensities of the diffracted lights of zero order, (±1, 0) orders, (0, ±1) orders and (±1, ±1) orders is greater than 70% of the intensity of total diffracted light.

In Table 1 below, ○ represents Good and △ represents Acceptable. Also, Ratio A represents the ratio of the intensity of the diffracted light of each of (±1, 0) and (0, ±1) orders relative to the intensity of the diffracted light of zero order at 550 nm in wavelength, Ratio B represents the ratio of the intensity of the diffracted light of each of (±1, ±1) orders relative to the intensity of the diffracted light of zero order at 550 nm in wavelength, and Ratio C represents the ratio of the sum of the respective intensities of the diffracted lights of zero, (±1, 0), (0, ±1) and (±1, ±1) orders relative to the intensity of the total diffracted light at 550 nm in wavelength.

TABLE 1

| No. of Grating | Measured Values Diffracted Light Intensity | | | Evaluation of Image | |
|---|---|---|---|---|---|
| | Ratio A (%) | Ratio B (%) | Ratio C (%) | Reduction in Image Quality | Contrast |
| 1 | 50 | 15 | 55 | △ | △ |
| 2 | 50 | 40 | 70 | △ | ○ |
| 3 | 60 | 25 | 65 | ○ | △ |
| 4 | 60 | 45 | 85 | ○ | ○ |
| 5 | 100 | 20 | 75 | ○ | ○ |
| 6 | 100 | 90 | 95 | ○ | ○ |
| 7 | 130 | 30 | 65 | ○ | △ |
| 8 | 130 | 55 | 70 | ○ | ○ |
| 9 | 160 | 100 | 70 | ○ | ○ |
| 10 | 160 | 330 | 95 | ○ | ○ |
| 11 | 180 | 330 | 90 | ○ | ○ |
| 12 | 180 | 345 | 95 | ○ | △ |
| 13 | 195 | 205 | 95 | ○ | △ |
| 14 | 195 | 330 | 95 | ○ | △ |

Thus, when the two-dimensional diffraction grating 5 satisfying the foregoing conditions (1) to (3) is employed, it is clear that the intensity of diffracted light within the first area 21 encompassed by the diffracted lights of (1, 1), (1, -1), (-1,-1) and (-1, 1) orders is higher than that within the second area 22 outside the first area 21 as shown in FIG. 5 and that any possible reduction in image quality and contrast which would otherwise result from the shades of the non-linear elements can advantageously be minimized because of the two-dimensional diffraction grating and, also, because the conditions (1) to (3) described above when satisfied allows the ratio between the brightness at a center portion and that at a peripheral portion within the first area 21 to fall within a favorable range.

It is to be noted that the directions X and Y in which the respective patterns of the grating elements are developed in the two-dimensional diffraction grating 5 may be either matched with the horizontal direction H or the vertical direction V of the pixels 10 of the active matrix liquid crystal cell 4 or inclined relative to any one of the horizontal and vertical directions H and V of the pixels 10. Also, as hereinbefore discussed, the angle between the X- and Y-directions in which the respective patterns of the grating elements are formed may not be always limited to 90 degrees.

The two-dimensional diffraction grating 5 employed in the present invention can be manufactured by forming a photosensitive resinous layer on a substrate made of, for example, glass, exposing the photosensitive resinous layer to light by the use of a masked exposure method or an interference exposure method in which a photo-masking medium having a pattern of grating elements in one direction formed therein, again exposing the photosensitive resinous layer to light after the substrate has been rotated, and finally developing the photosensitive resinous layer. If desired, using the two-dimensional diffraction grating so manufactured in the manner described above, a stamper (a mold) may be prepared so that a plurality of replicas of the two-dimensional diffraction gratings can be manufactured by means of an injection molding technique, a compression molding technique or a photo-polymerization (2P) technique.

Figure 7A:
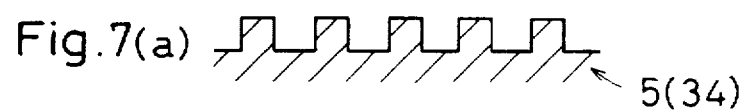
FIGS. 7a, 7b and 7c are fragmentary sectional views, on an enlarged scale, showing different sectional shapes of modified two-dimensional diffraction gratings which may be employed in the practice of the present invention.
Figure 7B:
Figure 7C:

Although the two-dimensional diffraction grating 5 shown in and described with particular reference to FIG. 2 has a generally sinusoidal cross-sectional shape along any one of X- and Y-directions, it may have a generally rectangular cross-sectional shape as shown in FIG. 7a or a generally saw-toothed cross-sectional shape as shown in FIG. 7b, or generally trapezoidal cross-sectional shape as shown in FIG. 7c. However, the use of the two-dimensional diffraction grating having a generally sinusoidal cross-sectional shape referred to above is advantageous in that the diffracted light of high order of a low intensity can easily be obtained.

Figure 8:
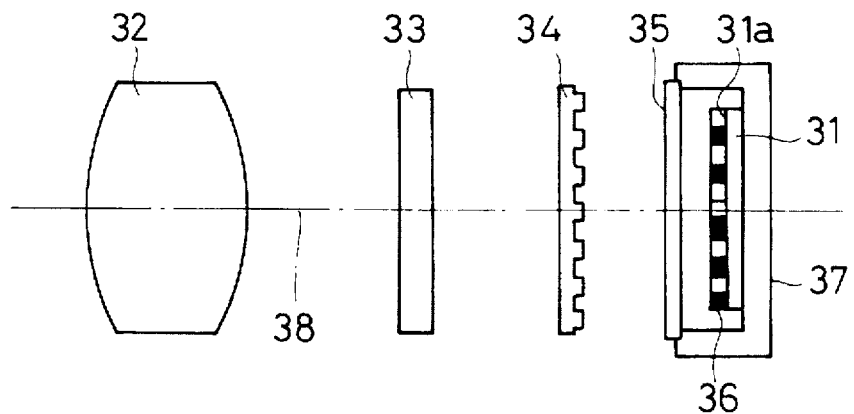
FIG. 8 is a schematic diagram showing the optical system employed in the imaging device according to a second preferred embodiment of the present invention.

A color imaging device according to a second preferred embodiment of the present invention is shown in FIG. 8. This color imaging device shown in FIG. 8 has an optical path 38 and includes a solid-state imaging element 31 for converting incident light into an electric signal, a photo-taking lens 32 for focusing imagewise rays of light carrying an image of an external object being imaged on the solid-state imaging element 31, an infra-red cut-off filter 33 disposed on the optical path 38 at a location between the solid-state imaging element 31 and the photo-taking lens 32, an optical low-pass filter 34 employed in the form of a two-dimensional diffraction grating and positioned between the solid-state imaging element 31 and the infra-red cut-off filter 33 and a protective glass plate 35 interposed between the optical low-pass filter 34 and the solid-state imaging element 31, each disposed on the optical path 38.

The solid-state imaging element 31 is encased within a casing 37 with a color filter array 36 fitted to an imaging surface 31a of the solid-state imaging element 31 and sealingly protected within the casing 37 by means of the protective glass plate 35 secured to the casing 37.

The two-dimensional diffraction grating forming the optical low-pass filter 34 is identical with that shown in and described with particular reference to FIG. 2. Therefore, the X- and Y-directions in which the respective patterns of the grating elements are developed in the optical low-pass filter 34 may be either matched with the horizontal and vertical directions along which elements or pixels forming the solid-state imaging element 31 are disposed, respectively, or inclined relative to the horizontal and vertical directions thereof, respectively.

Since the optical low-pass filter 34 employed according to the second preferred embodiment of the present invention is the two-dimensional diffraction grating of the type hereinbefore described in connection with the first preferred embodiment of the present invention, the intensity of each of diffracted lights of (1, 0) order, (0, -1) order, (-1, 0) order and (0, 1) order and that of each of diffracted lights of ((1, 1) order, (1, -1) order, (-1, -1) order and (-1, 1) order are considerably higher than the intensity of diffracted light of higher order, for example, that of each of diffracted lights of (2, 2) order and (2, -2) order. Accordingly, the extent to which the contrast of the image is lowered and the degree of blurring of the image are both minimal.

Using a number of optical low-pass filters 34 which have been manufactured so as to have different grating heights and shapes, a series of experiments have been conducted to determine the extent to which the contrast of images is lowered. Results of these experiments are shown in Table 2.

As Table 2 makes it clear, if the following conditions (4) to (6) are satisfied relative to the intensity of diffracted light of zero order at the center wavelength (550 nm) of the solid-state imaging element referred to above, the extent to which the image contrast is lowered is extremely low:

(4) the intensity of each of diffracted lights of (±1, 0) orders and that of each of diffracted lights of (0, ±1) orders are within the range of 90 to 210% of the intensity of the diffracted light of zero order, (5) the intensity of each of diffracted lights of (±1, ±1) orders is within the range of 20 to 420% of the intensity of the diffracted light of zero order, and (6) the sum of the intensities of the diffracted lights of zero order, (±1, 0) orders, (0, ±1) orders and (±1, ±1) orders is greater than 60% of the intensity of total diffracted light.

TABLE 2

| No. of Grating | Measured Values Diffracted Light Intensity | | | Evaluation of Image Contrast |
|---|---|---|---|---|
| | Ratio D (%) | Ratio E (%) | Ratio F (%) | |
| 1 | 80 | 15 | 50 | Δ |
| 2 | 80 | 50 | 60 | Δ |
| 3 | 90 | 25 | 55 | Δ |
| 4 | 90 | 60 | 80 | ○ |
| 5 | 120 | 20 | 70 | ○ |
| 6 | 120 | 110 | 95 | ○ |
| 7 | 150 | 30 | 55 | Δ |
| 8 | 150 | 70 | 60 | ○ |
| 9 | 180 | 200 | 60 | ○ |
| 10 | 180 | 420 | 95 | ○ |
| 11 | 210 | 420 | 90 | ○ |
| 12 | 210 | 430 | 95 | Δ |
| 13 | 230 | 330 | 95 | Δ |
| 14 | 230 | 420 | 95 | Δ |

In Table 2 above, ○ represents Good and Δ represents Acceptable. Also, Ratio D represents the ratio of the intensity of the diffracted light of each of (±1, 0) and (0, ±1) orders relative to the intensity of the diffracted light of zero order at 550 nm in wavelength. Ratio E represents the ratio of the intensity of the diffracted light of each of the (35 1, ±1) orders relative to the intensity of the diffracted light of zero order at 550 nm in wavelength, and Ratio F represents the ratio of the sum of the respective intensities of the diffracted lights of zero, (±1, 0), (0, ±1) and (±1, ±1) orders relative to the intensity of the total diffracted light at 550 nm in wavelength.

Thus, when the two-dimensional diffraction grating 5 satisfying the foregoing conditions (4) to (6) is employed, it is clear that, since the intensity of diffracted light within the first area 21 encompassed by the diffracted lights of (1, 1), (1, −1), (−1, −1) and (−1, 1) orders is considerably higher than that within the second area 22 outside the first area 21 as shown in FIG. 5, any possible reduction in contrast and the occurrence of a blurring of the image can advantageously be minimized. Also, since the two-dimensional diffraction grating 34 serves as an optical low-pass filter effective to eliminate a high spatial frequency component of the imagewise rays of light reflected from the object to be imaged, it is possible to avoid any possible generation of a spurious signal and a spurious color signal.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, while the image display device has been described as employed in the form of the active matrix liquid crystal cell 4, those skilled in the art will readily recognize that the present invention is equally applicable to the use of any other display device such as, for example, a plasma display panel (PDP), electroluminescence (EL) or light emitting diode (LED) and that the image display device employing the liquid crystal cell finds a wide range of application, for example, a liquid crystal video projector other than the viewfinder.

Also, the image display may be a liquid crystal television receiver utilizing the liquid crystal cell 4 that can be directly viewed with no lens group 3 used, and the imaging device may be either a video camera or an electronic still camera.

Accordingly, such changes and modifications are, unless they depart from the scope of the present invention as delivered from the claims annexed hereto, to be construed as included therein.

What is claimed is:

1. An image display device which comprises:
    an image display unit including a plurality of pixels patterned in a dot matrix in two dimensions and having a path of travel of imagewise rays of light;
    a two-dimensional diffraction grating disposed in the path of travel of the imagewise rays of light and having a first face opposing a second face said first face having a contoured surface, said second face having a second surface, said contoured surface of said first face defining a plurality of grating elements periodically arranged along first and second directions that are different from each other;
    wherein said grating elements along an arbitrarily chosen section along said first direction have a substantially uniform grating height and said grating elements along an arbitrarily chosen section along said second direction have a substantially uniform grating height; and
    wherein every area of said contoured surface is not parallel to any area of said second surface.

2. The image display device as claimed in claim 1, wherein said two-dimensional diffraction grating has grating element heights and a shape that, in combination exhibit such a characteristic at a center wavelength of the image display device that the intensity of each of diffracted lights of (±1, 0) orders and diffracted lights of (0, ±1) orders is within the range of 60 to 180% of the intensity of diffracted light of zero order, the intensity of each of diffracted lights of (±1, ±1) orders is within the range of 20 to 330% of the intensity of the diffracted light of zero order, and the sum of the intensity of the diffracted light of zero order, the intensities of the diffracted lights of (±1, 0) orders, those of the diffracted lights of (0, ±1) orders and those of the diffracted lights of (±1, ±1) orders is greater than 70% of the intensity of total diffracted light.

3. The image display device as claimed in claim 1, wherein said two-dimensional diffraction grating has a cross-sectional configuration of one of generally sinusoidal, rectangular, saw-toothed and trapezoidal shape along either the first or second direction.

4. The image display device as claimed in claim 1, wherein said two-dimensional diffraction grating has sinusoidal cross-section.

5. A device according to claim 1, wherein said two-dimensional diffraction grating forms projections.

6. An image display device which comprises:

an image display unit including a plurality of pixels patterned into a dot matrix in two dimensions, the image display unit having a first image display unit face and a second image display unit face; and a two-dimensional diffraction grating, the two-dimensional diffraction grating having a first two-dimensional diffraction grating face and a second two-dimensional diffraction grating face; and wherein the first image display unit face opposes the first two-dimensional diffraction grating face;

wherein either the first two-dimensional diffraction grating face or the second two-dimensional diffraction grating face has a contoured surface that is contoured to provide a periodic surface contour in any section along the first direction, the periodic surface contour in any section along the first direction having a first periodicity, and a periodic surface contour in any section along the second direction, the periodic surface contour in any section along the second direction having a second periodicity;

wherein there is no section along either the first direction or the second direction for which the surface contour of said contoured surface is not periodic; and wherein every area of said contoured surface is not parallel to any area of a surface of the face of said two dimensional diffraction grating opposing the face having said contoured surface.

7. A device according to claim 6, wherein the surface contour provides (1) intensity of diffracted light of ($\pm 1$, 0) orders and diffracted light of (0, $\pm 1$) orders that is within the range of 60–180 percent of the intensity of diffracted light of zero order;

(2) intensity of diffracted light of ($\pm 1$, $\pm 1$) orders that is within the range of 20–330 percent of the intensity of the diffracted light of zero order; and (3 the sum of the intensity of the diffracted light of zero order, the intensities of the diffracted light of ($\pm 1$, 0) orders, the intensity of the diffracted light of (0, $\pm 1$) orders, and the intensity of the diffracted light of ($\pm 1$, $\pm 1$) orders is greater than 70 percent of the intensity of all of the diffracted light.

8. An image display device according to claim 6, wherein the surface contour has a cross-sectional configuration that is one of generally sinusoidal, generally rectangular, generally saw-toothed, and generally trapezoidal along either the first or the second direction.

9. An image display device which comprises:

an image display unit including a plurality of pixels patterned in a dot matrix in two dimensions and having a path of travel of imagewise rays of light;

a two-dimensional diffraction grating disposed in the path of travel of the imagewise rays of light and having a first face opposing a second face, said first face having a contoured surface, said second face having a second surface, said contoured surface of said first face defining a plurality of grating elements periodically arranged along first and second directions that are different from each other;

wherein said grating elements along an arbitrarily chosen section along said first direction have a substantially uniform grating height and said grating elements along an arbitrarily chosen section along said second direction have a substantially uniform grating height; and wherein every sectioned contour of said contoured surface sectioned along either the first direction or the second direction is not parallel to any area of said second surface.

10. An image display device which comprises:

an image display unit including a plurality of pixels patterned into a dot matrix in two dimensions, the image display unit having a first image display unit face and a second image display unit face; and a two-dimensional diffraction grating, the two-dimensional diffraction grating having a first two-dimensional diffraction grating face and a second two-dimensional diffraction grating face; and wherein the first image display unit face opposes the first two-dimensional diffraction grating face;

wherein either the first two-dimensional diffraction grating face or the second two-dimensional diffraction grating face has a contoured surface that is contoured to provide a periodic surface contour in any section along the first direction, the periodic surface contour in any section along the first direction having a first periodicity, and a periodic surface contour in any section along the second direction, the periodic surface contour in any section along the second direction having a second periodicity;

wherein there is no section along either the first direction or the second direction for which the surface contour of said contoured surface is not periodic; and order;

wherein every sectioned contour of said contoured surface sectioned along either the first direction or the second direction is not parallel to any area of a surface of the face of said two-dimensional diffraction grating opposing the face having said contoured surface.

* * * * *